United States Patent
Li et al.

(10) Patent No.: US 10,496,829 B2
(45) Date of Patent: Dec. 3, 2019

(54) METHOD AND SYSTEM FOR DATA DESTRUCTION IN A PHASE CHANGE MEMORY-BASED STORAGE DEVICE

(71) Applicant: Alibaba Group Holding Limited, George Town, Grand Cayman (KY)

(72) Inventors: Shu Li, Bothell, WA (US); Ping Zhou, Folsom, CA (US)

(73) Assignee: Alibaba Group Holding Limited, George Town (KY)

( * ) Notice: Subject to any disclaimer, the term of this patent is extended or adjusted under 35 U.S.C. 154(b) by 74 days.

(21) Appl. No.: 15/705,698

(22) Filed: Sep. 15, 2017

(65) Prior Publication Data

US 2019/0087587 A1     Mar. 21, 2019

(51) Int. Cl.

| | |
|---|---|
| H04L 29/06 | (2006.01) |
| G06F 21/60 | (2013.01) |
| G11C 13/00 | (2006.01) |
| G06F 3/06 | (2006.01) |
| H04L 9/14 | (2006.01) |
| G06F 11/10 | (2006.01) |
| G11C 29/52 | (2006.01) |
| H04L 9/08 | (2006.01) |

(52) U.S. Cl.
CPC .......... *G06F 21/602* (2013.01); *G06F 3/064* (2013.01); *G06F 3/0623* (2013.01); *G06F 3/0652* (2013.01); *G06F 3/0679* (2013.01); *G06F 11/1068* (2013.01); *G11C 13/0004* (2013.01); *G11C 13/0097* (2013.01); *G11C 29/52* (2013.01); *H04L 9/0894* (2013.01); *H04L 9/14* (2013.01)

(58) Field of Classification Search
CPC ...................................................... G06F 21/62
See application file for complete search history.

(56) References Cited

U.S. PATENT DOCUMENTS

| | | |
|---|---|---|
| 4,775,932 A | 10/1988 | Oxley |
| 6,226,650 B1 | 5/2001 | Mahajan et al. |

(Continued)

FOREIGN PATENT DOCUMENTS

| | | |
|---|---|---|
| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Taghi T Arani
*Assistant Examiner* — Lin Chang
(74) *Attorney, Agent, or Firm* — Shun Yao; Park, Vaughan, Fleming & Dowler LLP (57) ABSTRACT

One embodiment facilitates data destruction in a phase change memory-based storage device. During operation, the system detects, by the storage device, a power loss. Subsequent to the power loss, the system overwrites keys and configuration information used to transform data stored in the phase change memory, wherein the keys and the configuration information are stored in the phase change memory, thereby preventing the data from being recovered.

18 Claims, 9 Drawing Sheets

(56) References Cited

U.S. PATENT DOCUMENTS

| | | |
|---|---|---|
| 7,565,454 B2 | 7/2009 | Zuberi |
| 8,260,924 B2 | 9/2012 | Koretz |
| 8,452,819 B1 | 5/2013 | Sorenson, III |
| 8,516,284 B2 | 8/2013 | Chan |
| 9,043,545 B2 | 5/2015 | Kimmel |
| 9,088,300 B1 | 7/2015 | Chen |
| 9,092,223 B1 | 7/2015 | Pani |
| 9,588,698 B1 | 3/2017 | Karamcheti |
| 9,588,977 B1 | 3/2017 | Wang |
| 2002/0010783 A1 | 1/2002 | Primak |
| 2002/0073358 A1 | 6/2002 | Atkinson |
| 2002/0161890 A1 | 10/2002 | Chen |
| 2003/0074319 A1* | 4/2003 | Jaquette ............. G06F 21/6218 705/51 |
| 2003/0163594 A1 | 8/2003 | Aasheim |
| 2003/0163633 A1 | 8/2003 | Aasheim |
| 2004/0010545 A1 | 1/2004 | Pandya |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235171 A1 | 10/2005 | Igari |
| 2006/0156012 A1 | 7/2006 | Beeson |
| 2007/0033323 A1 | 2/2007 | Gorobets |
| 2008/0034154 A1 | 2/2008 | Lee |
| 2009/0113219 A1 | 4/2009 | Aharonov |
| 2009/0282275 A1 | 11/2009 | Yermalayeu |
| 2009/0307249 A1 | 12/2009 | Koifman |
| 2010/0229224 A1 | 9/2010 | Etchegoyen |
| 2010/0241848 A1* | 9/2010 | Smith .................... G01D 4/004 713/153 |
| 2010/0321999 A1* | 12/2010 | Yoo ..................... G11C 11/5628 365/185.03 |
| 2010/0325367 A1 | 12/2010 | Kornegay |
| 2011/0055458 A1 | 3/2011 | Kuehne |
| 2011/0153903 A1 | 6/2011 | Hinkle |
| 2011/0218969 A1 | 9/2011 | Anglin |
| 2011/0231598 A1 | 9/2011 | Hatsuda |
| 2011/0292538 A1 | 12/2011 | Haga |
| 2011/0302353 A1 | 12/2011 | Confalonieri |
| 2012/0039117 A1* | 2/2012 | Webb ................. G11C 13/0004 365/163 |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0233523 A1* | 9/2012 | Krishnamoorthy ......................... G06F 11/1068 714/758 |
| 2012/0246392 A1 | 9/2012 | Cheon |
| 2012/0278579 A1* | 11/2012 | Goss ................... G06F 12/0246 711/166 |
| 2012/0284587 A1 | 11/2012 | Yu |
| 2013/0073798 A1 | 3/2013 | Kang |
| 2013/0145085 A1 | 6/2013 | Yu |
| 2013/0145089 A1 | 6/2013 | Eleftheriou |
| 2013/0159251 A1 | 6/2013 | Skrenta |
| 2013/0166820 A1 | 6/2013 | Batwara |
| 2013/0173845 A1 | 7/2013 | Aslam |
| 2013/0219131 A1 | 8/2013 | Alexandron |
| 2013/0318283 A1 | 11/2013 | Small |
| 2013/0318395 A1* | 11/2013 | Kalavade ........... H03M 13/1102 714/15 |
| 2014/0108414 A1 | 4/2014 | Stillerman |
| 2014/0181532 A1* | 6/2014 | Camp ................. G06F 11/1068 713/190 |
| 2014/0233950 A1 | 8/2014 | Luo |
| 2014/0250259 A1 | 9/2014 | Ke |
| 2014/0310574 A1 | 10/2014 | Yu |
| 2014/0359229 A1 | 12/2014 | Cota-Robles |
| 2014/0365707 A1 | 12/2014 | Talagala |
| 2015/0019799 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0304108 A1* | 10/2015 | Obukhov ............ G06F 21/6209 713/193 |
| 2015/0372597 A1 | 12/2015 | Luo |
| 2016/0098344 A1 | 4/2016 | Gorobets |
| 2016/0110254 A1 | 4/2016 | Cronie |
| 2016/0188890 A1* | 6/2016 | Naeimi .................... G06F 21/34 711/103 |
| 2016/0232103 A1 | 8/2016 | Schmisseur |
| 2016/0239074 A1 | 8/2016 | Lee |
| 2016/0239380 A1 | 8/2016 | Wideman |
| 2016/0343429 A1 | 11/2016 | Nieuwejaar |
| 2016/0350002 A1 | 12/2016 | Vergis |
| 2017/0109232 A1 | 4/2017 | Cha |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262178 A1 | 9/2017 | Hashimoto |
| 2017/0285674 A1* | 10/2017 | Durham ................. G06F 21/79 |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0088867 A1 | 3/2018 | Kaminaga |
| 2018/0150640 A1* | 5/2018 | Li ....................... G06F 21/6218 |
| 2018/0189182 A1 | 7/2018 | Wang |
| 2018/0329776 A1 | 11/2018 | Lai |
| 2019/0012111 A1 | 1/2019 | Li |
| 2019/0073262 A1 | 3/2019 | Chen |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

* cited by examiner

METHOD AND SYSTEM FOR DATA DESTRUCTION IN A PHASE CHANGE MEMORY-BASED STORAGE DEVICE

BACKGROUND

Field

This disclosure is generally related to the field of data storage. More specifically, this disclosure is related to a method and system for facilitating data destruction in a phase change memory-based storage device.

Related Art

The proliferation of the Internet and e-commerce continues to create a vast amount of digital content. Various storage systems have been created to access and store such digital content. One such storage system uses phase change memory (PCM), which is a type of non-volatile random access memory. PCM uses a specific type of glass and can hold multiple bits in a single cell (or sector). PCM is faster than NAND flash, and has a higher density than conventional dynamic random access memory (DRAM). PCM has a low read/write latency, and may be used for fast persistent data storage. In contrast with a DRAM Dual In-line Memory Module (DIMM) (which loses its data after a power loss), PCM, as a non-volatile memory, retains its stored data even after a power loss. The data stored in the PCM may include sensitive information, which can be vulnerable to unwanted access after a power loss. One way to protect the data is to overwrite all of the data stored in the PCM. However, because the PCM can have a high density and a high capacity (e.g., 4 terabytes), it is neither feasible nor efficient to overwrite all the physical cells of the PCM. For example, after a power loss, there may be an insufficient amount of residual charge to overwrite all the cells of the PCM. Furthermore, making the stored data permanently unrecoverable after a power loss may not be a desired strategy for managing the system. Thus, while PCM provides benefits including both an access speed greater than NAND flash and a storage capacity greater than DRAM, the issue of efficient data destruction to protect sensitive data after a power loss remains unsolved.

SUMMARY

One embodiment facilitates data destruction in a phase change memory-based storage device. During operation, the system detects, by the storage device, a power loss. Subsequent to the power loss, the system overwrites keys and configuration information used to transform data stored in the phase change memory, wherein the keys and the configuration information are stored in the phase change memory, thereby preventing the data from being recovered.

In some embodiments, subsequent to the power loss: the system overwrites an area of the phase change memory based on an indicator that the area includes sensitive information to be overwritten upon detecting the power loss; and the system overwrites one or more blocks of the data stored in the phase change memory.

In some embodiments, overwriting the keys, the configuration information, the area, and the blocks of the phase change memory comprises allowing a crosstalk to increase for a cell and neighboring cells.

In some embodiments, the keys are stored in the phase change memory of a memory module of the storage device, and the memory module communicates with a central processing unit via a memory bus. The configuration information and the transformed data are stored in the phase change memory of a storage module of the storage device, and the storage module communicates with the central processing unit via a peripheral component interconnect express protocol.

In some embodiments, the configuration information indicates an alignment, an ordering, and an error correction code encoding used to transform the data, wherein the error correction code encoding is based on a low-density parity check code, and wherein the configuration information indicates locations at which to place data for variable nodes in a trapping set.

In some embodiments, subsequent to the power loss: the system overwrites metadata associated with a file system for the storage device; and the system overwrites pages in a data recovery stripe.

In some embodiments, the system receives, by the storage device, a first set of data to be stored in the phase change memory. The system stores a first key for the first set of data, and encrypts the first set of data based on the first key. The system transforms, based on the configuration information, the encrypted data by reordering the bits of the encrypted data and the first key and by encoding the reordered bits to obtain a codeword. The system stores the transformed data in the phase change memory.

In some embodiments, the system receives, by the storage device, a request to read a first set of data stored in the phase change memory. The system retrieves a first key for the first set of data, and retrieves, from the phase change memory, transformed data corresponding to the first set of data. The system recovers encrypted data by decoding the transformed data and reordering bits of the decoded data and the first key. The system decrypts the encrypted data based on the first key to obtain the first set of data. The system returns the first set of data to a requesting application.

Another embodiment facilitates data destruction in a phase change memory-based storage device. The device comprises: a memory module which includes a first phase change memory; and a storage module which includes a second phase change memory. In response to detecting a power loss, the device overwrites keys and configuration information used to transform data stored in the second phase change memory, wherein the keys are stored in the first phase change memory and the configuration information is stored in the second phase change memory. The storage module further includes: an encryption module configured to receive data and a key, and to encrypt the data based on a key; an interleaver module configured to reorder the encrypted data; and an encoder module configured to encode the reordered bits to obtain a codeword, wherein the codeword is stored in the second phase change memory, thereby preventing the data from being recovered.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of protecting the recovery of data in a PCM-based storage device after a power loss by providing a system which uses residual power to overwrite a small portion of specific data in the PCM, thus avoiding the need to overwrite all the data stored in the PCM.

DRAM DIMM is a volatile memory which loses its data after a power loss. In contrast, PCM (which is faster than NAND flash and has a higher density than conventional DRAM) is a non-volatile memory which retains its stored data even after a power loss. The data stored in the PCM may include sensitive information, which can be vulnerable to unwanted access after a power loss. One way to protect the data is to overwrite all of the data stored in the PCM. However, because the PCM can have a high density and a high capacity (e.g., 4 terabytes), it is neither feasible nor efficient to overwrite all the physical cells of the PCM. For example, after a power loss, there may be an insufficient amount of residual charge to overwrite all the cells of the PCM. Furthermore, making the stored data permanently unrecoverable after a power loss may not be a desired strategy for managing the system. Thus, while PCM provides benefits including both an access speed greater than NAND flash and a storage capacity greater than DRAM, the issue of efficient data destruction to protect sensitive data after a power loss remains unsolved.

The embodiments described herein solve this problem by providing a system which prevents data stored in the PCM from being recovered after a power loss, without overwriting all the physical cells of the PCM. While storing data in the PCM, the system encrypts and transforms the data based on a key and configuration information (which are stored in the PCM). The system transforms the data by reordering bits of the encrypted data and the key, and by encoding the reordered bits to obtain a codeword, e.g., based on a low-density parity check (LDPC) encoding scheme. The system subsequently stores the codeword in the PCM.

The system reads the data stored in the PCM in a reverse manner, based on both the key and the configuration information, e.g., by decoding a stored codeword and reordering the bits to obtain encrypted data based on the configuration information, and decrypting the encrypted data based on the key. Thus, in order to read the data, the system requires both the key and the configuration information. Without the key and the configuration information, the transformed data stored in the PCM cannot be properly read.

Upon detecting a power loss, the system overwrites the keys used to encrypt and transform (i.e., reorder and encode) the data stored in the PCM. The system also overwrites configuration information used to transform the data, as described below in relation to FIG. 2A. By overwriting the keys and the configuration information, the system prevents the data stored in the PCM from being recovered. The keys and the configuration information may use only a small amount of memory (e.g., 4 gigabytes), while the actual data stored in the PCM may use a much larger amount of memory (e.g., 4 terabytes). Thus, the actual stored data may use an amount of memory that is, e.g., three order of magnitude greater than the amount of memory used by the keys and configuration information. By overwriting the small portion of specific data (i.e., the keys and the configuration information) in the PCM, the system prevents the recovery of the much larger amount of data stored in the PCM. Thus, the system provides an efficient solution to the problem of facilitating data destruction in a PCM-based storage device.

The system can also overwrite flagged sensitive data in an area of the PCM, metadata associated with a file system, pages in a data recovery stripe, and, if necessary, one or more blocks of the actual data stored in the PCM. Overwriting a small portion of specific data to prevent the recovery of the actual data stored in the PCM is described below in relation to FIG. 5.

Thus, the embodiments described herein provide a system which improves the security of a storage system, where the improvements are fundamentally technological. The improved efficiency can include facilitating data destruction in a PCM-based storage device. The system provides a technological solution (i.e., a PCM-based storage device which, upon detecting a power loss, overwrites keys and configuration information used to transform data stored in the PCM, without overwriting all of the data stored in the PCM) to the technological problem of protecting PCM data which is retained and recoverable after a power loss and improving the overall security of the system.

The term "storage server" refers to a server which can include multiple drives and multiple memory modules.

The term "volatile memory" refers to computer storage which can lose data quickly upon removal of the power source, such as DRAM.

The term "non-volatile memory" refers to computer storage which can retrain data upon removal of the power source.

The term "phase change memory" or "PCM" refers to a type of non-volatile memory, which can be used for long-term persistent computer storage.

The term "phase change memory-based storage device" or "PCM-based storage device" device, which includes a PCM. The PCM-based storage device can include one or both of a PCM DIMM and a Peripheral Component Interconnect express (PCIe) PCM, as described below in relation to FIG. 1.

The term "ECC-encoding" refers to encoding data based on an error correction code, while the term "ECC-decoding" refers to decoding data based on the error correction code.

The term "low-density parity check" or "LDPC" encoding refers to using a class of binary linear block codes with a sparse parity-check matrix, i.e., which contain only a very small number of non-zero entries. LDPC codes are forward error-correction codes used in transmitting a message over a noisy channel, and whose performance can approach the Shannon's capacity. The term "trapping set" refers to a collection of variable nodes and check nodes which impede the error correcting ability of LDPC code.

Exemplary System

Figure 1:
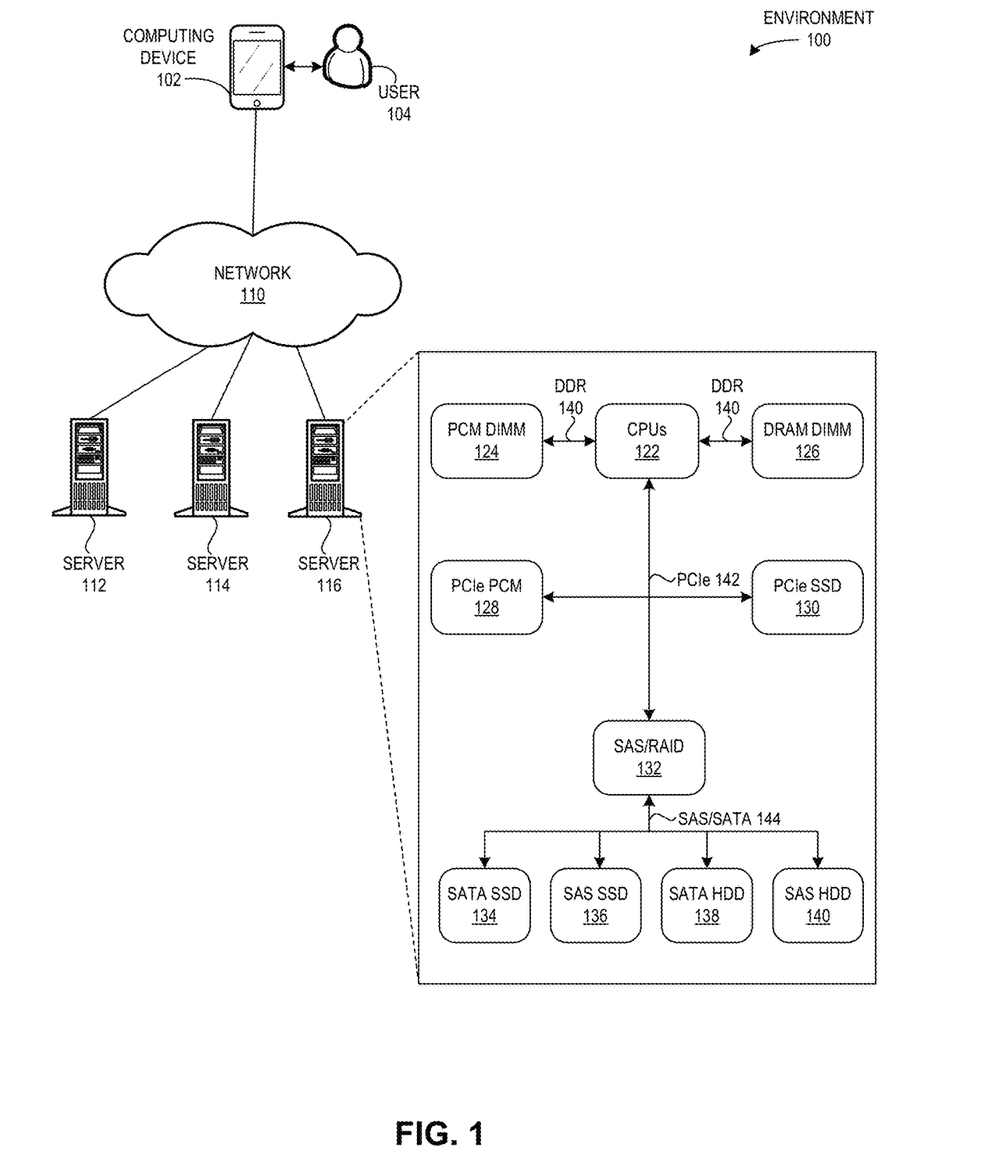
FIG. 1 illustrates an exemplary environment that facilitates data destruction in a phase change memory (PCM)-based storage device, in accordance with an embodiment of the present application.

FIG. 1 illustrates an exemplary environment 100 that facilitates data destruction in a phase change memory (PCM)-based storage device, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with servers 112, 114, and 116, which can be part of a distributed storage system. Servers 112-116 can include a storage server, which can include a phase change memory (PCM)-based storage device. For example, server 116 can include CPUs 122, which communicate with a PCM DIMM 124 and a DRAM DIMM 126 via a memory bus, e.g., a double data rate (DDR) 140 protocol. CPUs 122 can also communicate with a PCIe PCM 128, a Serial Attached SCSI (SAS)/Redundant Array of Independent Disks (RAID) 132, and a PCIe solid state drive (SSD) 130 via a PCIe 142 protocol. SAS RAID 132 can communicate with various solid state drives (SSDs) and hard disk drives (HDDs) (such as a Serial AT Attachment (SATA) SSD 134, a SAS SSD 136, a SATA HDD 138, and a SAS HDD 140) via an SAS/SATA 144 protocol.

In the embodiments described herein, PCM may be used as a storage tier with both a capacity and latency in between that of a DRAM DIMM and a PCIe SSD. The PCM may be built into both the DIMM form factor ("PCM DIMM") and the PCIe drive form factor ("PCIe PCM"). A PCM DIMM has a lower latency and a higher throughput than a PCIe PCM, while a PCIe PCM generally has a higher capacity than a PCM DIMM. A PCM-based storage device, as described herein, can include a controller which is configured to detect a power loss and, subsequent to the power loss, overwrite specific "critical" information stored in the PCM, whereby overwriting the specific critical information prevents the recovery of the data stored in the PCM.

Thus, server 116 depicts an exemplary architecture of a PCM-based storage device (which includes both PCM DIMM 124 and PCIe PCM 128). Exemplary write and read operations are described, respectively, below in relation to FIGS. 2A and 2B, while overwriting the specific critical information is described below in relation to FIG. 5.

Exemplary Communications for Writing to and Reading Data from PCM

Figure 2A:
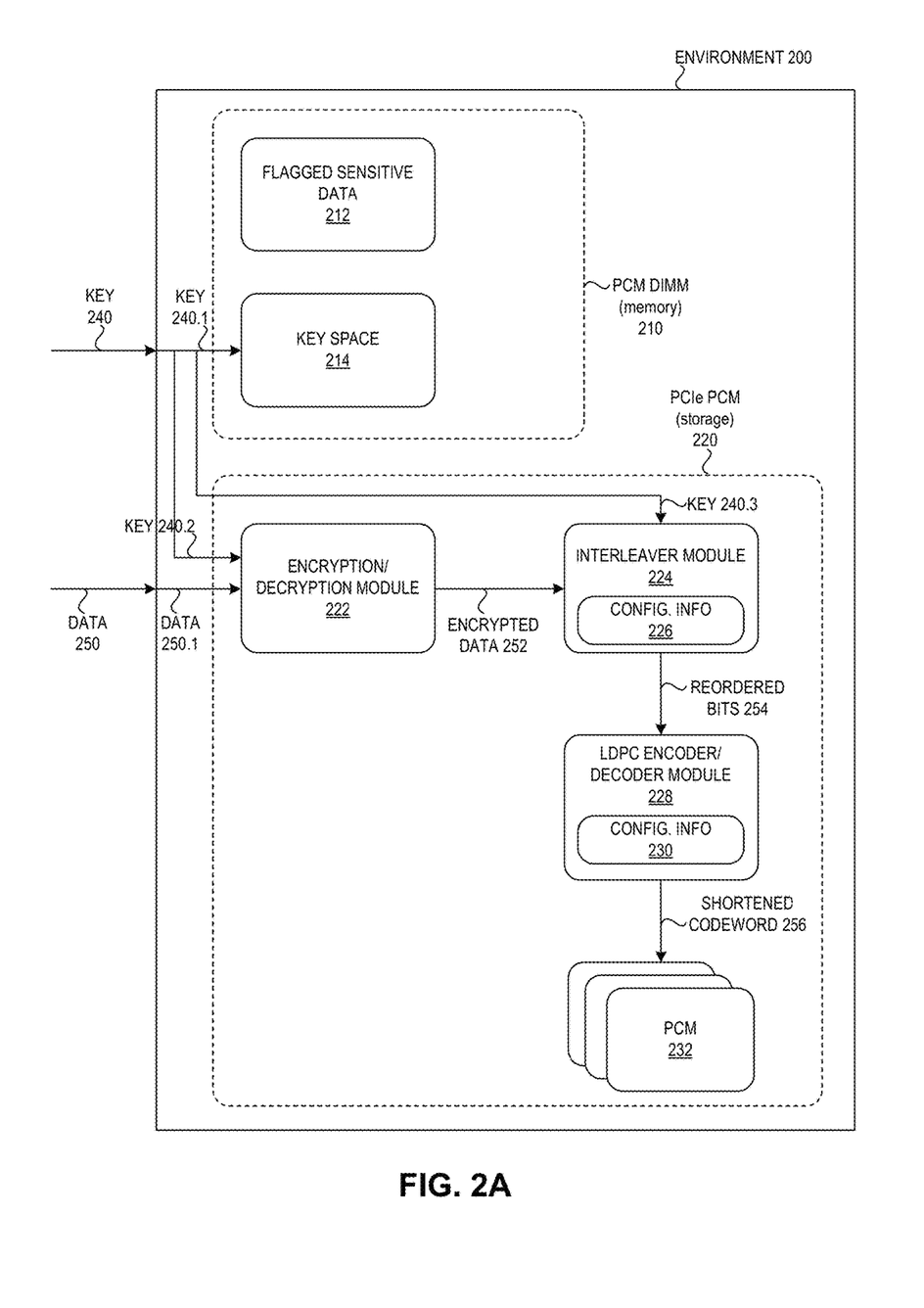
FIG. 2A illustrates an exemplary environment and communication for writing data in a PCM-based storage device, in accordance with an embodiment of the present application.

FIG. 2A illustrates an exemplary environment 200 and communication for writing data in a PCM-based storage device, in accordance with an embodiment of the present application. Environment 200 can be a storage server which includes a PCM DIMM (memory module) 210 and a PCIe PCM (storage module 220). PCM DIMM 210 can include flagged sensitive data 212, which is an area of the PCM that includes sensitive information to be overwritten upon detecting a power loss (e.g., sensitive or critical customer data). PCM DIMM 210 can also include a key space 214, which stores the keys used to transform data stored in the PCM.

PCIe PCM 220 can include an encryption/decryption module 222, an interleaver module 224 with configuration information 226, an LDPC encoder/decoder module 228 with configuration information 230, and PCM 232. During operation, server 200 can process a request to write data to the PCM. Server 200 can generate (or obtain from another entity or service) a key 240 corresponding to data 250 which is to be stored in PCM 232. Key 240 can be a private key used to encrypt and transform data. PCM DIMM 210 can receive the key (key 240.1) and store key 240.1 in key space 214. Encryption/decryption module 222 can receive both the key (key 240.2) and the data (data 250.1) and encrypt data 250.1 based on key 240.2 to obtain encrypted data 252. Encryption/decryption module 222 can send encrypted data 252 to interleaver module 224. Interleaver module 224 can receive encrypted data 252, as well as the key (key 240.3), and, based on configuration information 226, transform encrypted data 252 by reordering the bits of encrypted data 252 and inserted symbols of key 240.3 to obtain reordered bits 254. Configuration information 226 indicates how to align and order the bits, i.e., to change the sequence of the bits and to place symbols of the key at variable nodes in the trapping sets of the LDPC code, as described below in relation to FIGS. 3A and 3B.

Interleaver module 224 can send reordered bits 254 to LDPC encoder/decoder module 228. Upon receiving reordered bits 254, LDPC encoder/decoder module 228 can, based on configuration information 230, encode reordered bits 254 to obtain a codeword. Configuration information 230 (which can also be referred to as the "LDPC code memory") can include a parity check matrix, a decoding schedule, and other data used to encode the data based on the LDPC. LDPC encoder/decoder module 228 can also remove the key symbols previously inserted by interleaver module 224 to obtain a shortened codeword 256. LCPD encoder/decoder module 228 can send shortened codeword 256 to (a controller module of) PCM 232, to be written to PCM 232.

Although environment 200 depicts both PCM DIMM 210 and PCIe PCM 220, in some embodiments, only one PCM-based storage device is used. If only PCM DIMM is used, the system can overwrite the flagged pages (e.g., flagged sensitive data 212) by utilizing the maximum amount of cross talk, as described herein. If only PCIe PCM is used, the system can store the keys in the PCIe PCM. The system can read the key out in parallel from the PCIe PCM or the PCM DIMM, along with the data itself, and subsequently use the key for the reversal of the encoding, interleaving, and encryption (i.e., for decoding, de-interleaving, and decryption).

Figure 2B:
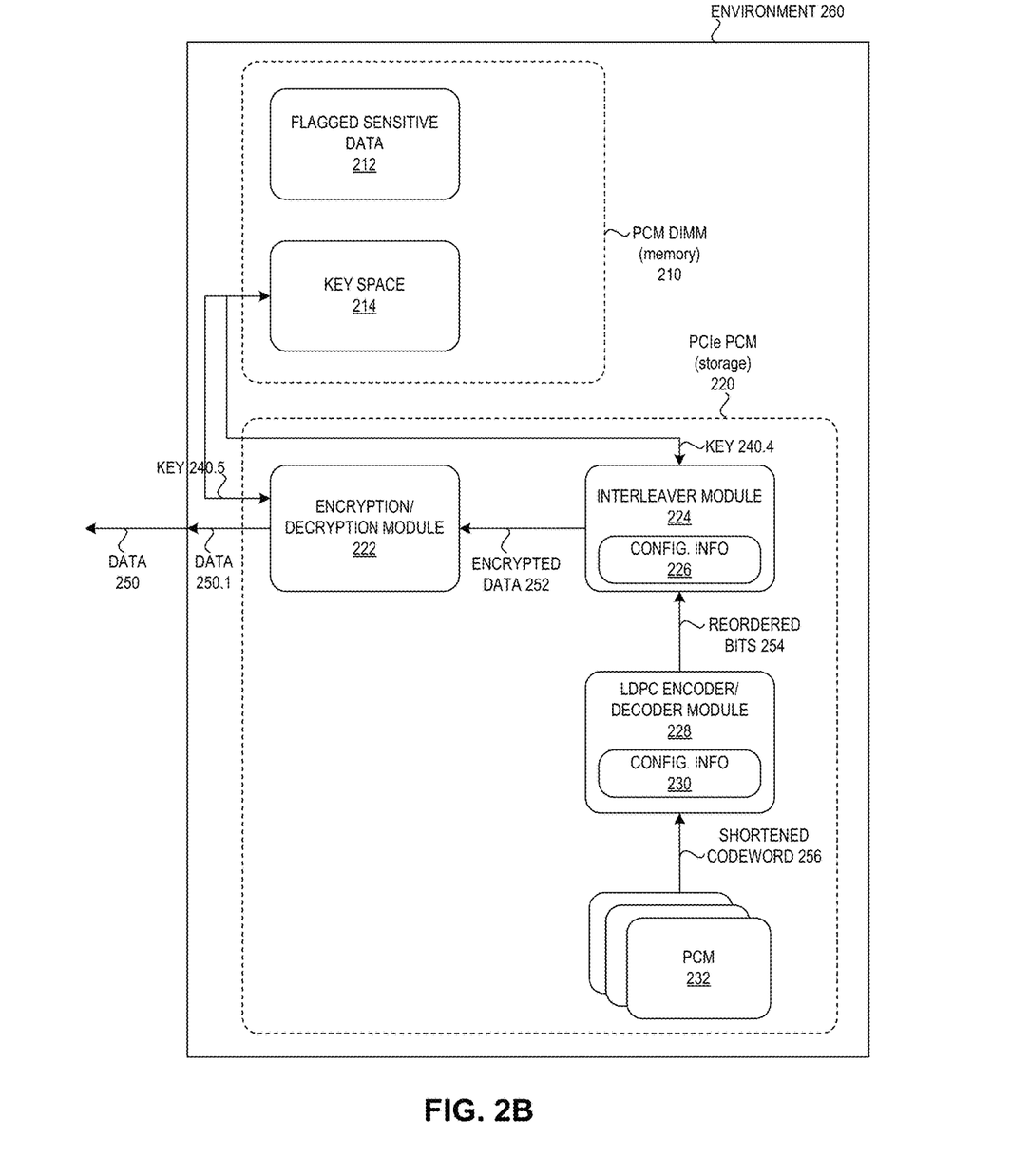
FIG. 2B illustrates an exemplary environment and communication for reading data in a PCM-based storage device, in accordance with an embodiment of the present application.

FIG. 2B illustrates an exemplary environment 260 and communication for reading data in a PCM-based storage device, in accordance with an embodiment of the present application. Environment 260 can be a PCM-based storage device. During operation, server 260 can process a request to read data from the PCM. The system can retrieve the requested transformed data stored in PCM 232 by obtaining and sending shortened codeword 256 from PCM 232 to LDPC encoder/decoder module 228. Upon receiving shortened codeword 256, LDPC encoder/decoder module 228 can use configuration information 230 to recover and send reordered encrypted bits 254 to interleaver module 224. Interleaver module 224 can obtain the corresponding key (key 240.4) and order the reordered encrypted bits 254 based on key 240.4. Interleaver module 224 can obtain and send to encryption/decryption module 222 encrypted data 252. Encryption/decryption module 222 can obtain and use the key (key 240.5) to decrypt encrypted data 252 to obtain data 250.1. Finally, server 260 can send data 250 to a requesting host or application.

Thus, by using a private key to transform the data to be stored in the PCM (i.e., by encrypting data, reordering encrypted bits along with the key, and encoding the reordered bits using an LDPC encoding), and by overwriting only the keys and configuration information used to transform the data, the embodiments described herein provide a PCM-based storage device which facilitates destruction of stored data in the PCM by preventing the data from being recovered.

Exemplary Use of Low-Density Parity Code Encoding

As described above, LDPC codes are forward error-correction codes used with a sparse parity-check matrix H which can be represented by a bi-partite graph (e.g., a Tanner graph) with a variable node set V and a check node set C. A parity matrix H of a code C is a matrix which generates the nullspace of the code C. A trapping set is a collection of variable nodes and check nodes which impede the error correcting ability of LDPC code. Even if there are very few nodes in error after transmission, if enough of those nodes belong to a trapping set, subsequent decoding of the encoded message will fail. The embodiments described herein utilize this decoding failure by inserting the key symbols into locations in the data corresponding to variable nodes in a trapping set.

Figure 3A:
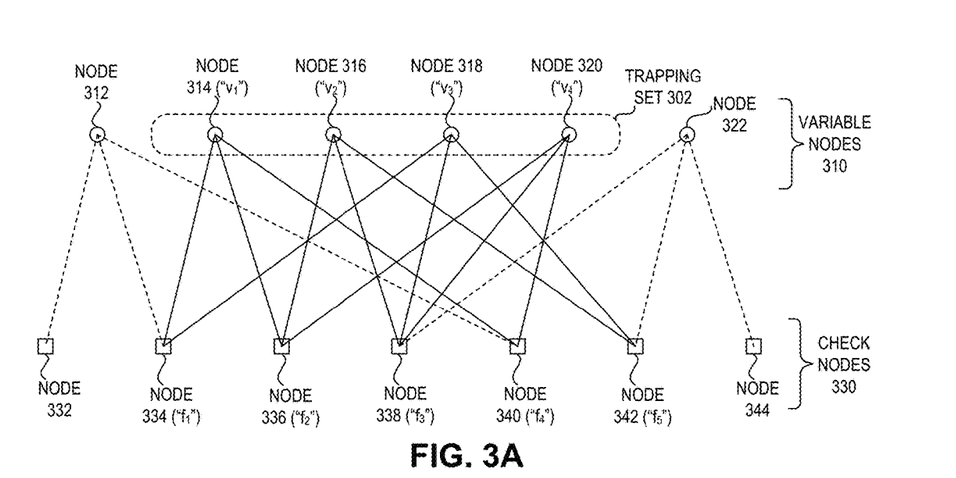
FIG. 3A illustrates an exemplary trapping set in a Tanner graph with variable nodes and check nodes, in accordance with an embodiment of the present application.

FIG. 3A illustrates an exemplary trapping set 302 in a Tanner graph with variable nodes 310 and check nodes 330, in accordance with an embodiment of the present application. Variable nodes 310 include a node 312, a node 314 ("$v_1$"), a node 316 ("$v_2$"), a node 318 ("$v_3$"), a node 320 ("$v_4$"), and a node 322. Check nodes 330 include a node 332, a node 334 ("$f_1$"), a node 336 ("$f_2$"), a node 338 ("$f_3$"), a node 340 ("$f_4$"), a node 342 ("$f_5$"), and a node 344. Trapping set 302 can include variable nodes $v_1$, $v_2$, $v_3$, and $v_4$, and forms a relatively isolated group from the other variable nodes and check nodes of the LDPC code.

In the embodiments described herein, the system places the LDPC encoding/decoding in a trapping set, which can result in a decoding failure based on local belief propagation loops within the variable nodes and check nodes of the trapping set. For example, the message on variable $v_1$ traverses through the closed loop of $v_1$, $f_2$, $v_4$, and $f_2$, and variable nodes $\{v_1, v_2, v_3, v_4\}$ along with check nodes $\{f_1, f_2, f_3, f_4, f_5\}$ form a self-compatible subset of the overall variable nodes and check nodes in the LDPC code. Recall that the key (including its member symbols) is known data. Thus, when the trapping sets are selected using the known data, the trapping sets do not prevent the LDPC decoding; rather, the trapping sets help the LDPC decoding because the key symbols in the trapping set provide correct information.

Figure 3B:
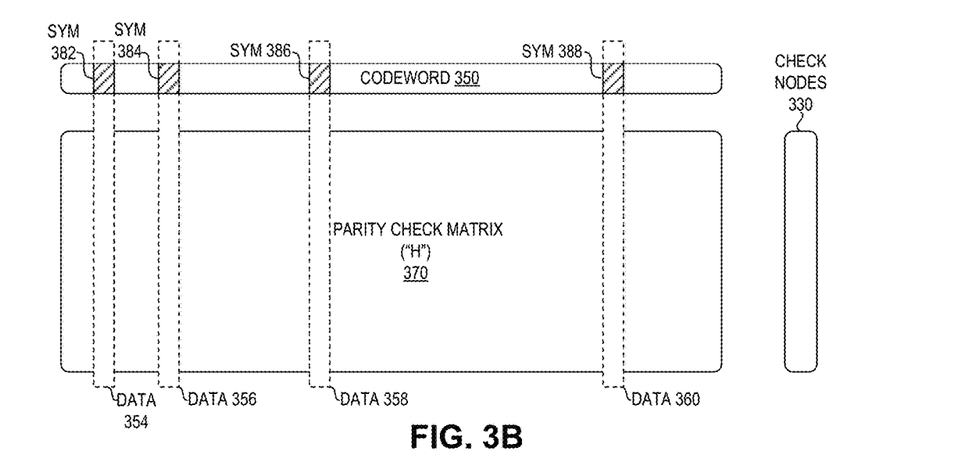
FIG. 3B illustrates a graphical representation of the locations in a codeword of the exemplary trapping set of FIG. 3A, in accordance with an embodiment of the present application.

FIG. 3B illustrates a graphical representation of the locations in a codeword 350 of the exemplary trapping set of FIG. 3A, in accordance with an embodiment of the present application. FIG. 3B includes codeword 350, a parity check matrix ("H") 370, and check nodes 330. FIG. 3B also includes rectangular dashed-line boxes of data 354, 356, 358, and 360. This data represents the variable nodes $\{v_1, v_2, v_3, v_4\}$ in trapping set 302 of FIG. 3A. Thus, symbols 382, 384, 386, and 388 are the value from respectively, data 354, 356, 358, and 360, at a given location in codeword 350.

Figure 3C:
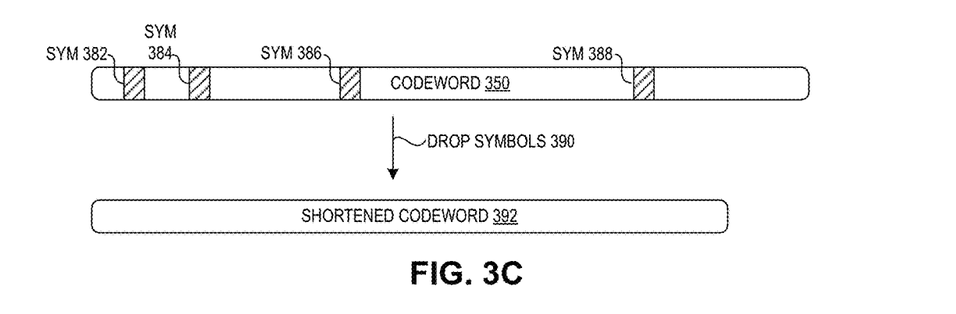
FIG. 3C illustrates a shortening of the codeword of FIG. 3B based on a removal of the symbols at the trapping set locations, in accordance with an embodiment of the present application.

FIG. 3C illustrates a shortening of codeword 350 of FIG. 3B based on a removal of the symbols at the trapping set locations, in accordance with an embodiment of the present application. Codeword 350 includes symbols from the key used to encrypt and transform the data to be stored in the PCM. For example, codeword 350 includes symbols 382, 384, 386, and 388, corresponding to the locations of the variable nodes $\{v_1, v_2, v_3, v_4\}$ in trapping set 302. The system can perform a drop symbols 390 function (which also concatenates the remaining data), to obtain a shortened codeword 392 (e.g., similar to LDPC encoder/decoder module 228 using configuration information 230 to obtain shortened codeword 256 in FIG. 2A). The system can subsequently store shortened codeword 392 in the PCM. That is, shortened codeword 392 is the transformed data to be stored in the PCM. Note that shortened codeword 392 is no longer aligned with the LDPC code, and thus cannot be directly decoded.

Exemplary Transformation Involved in Reading Data from PCM

Figure 4:
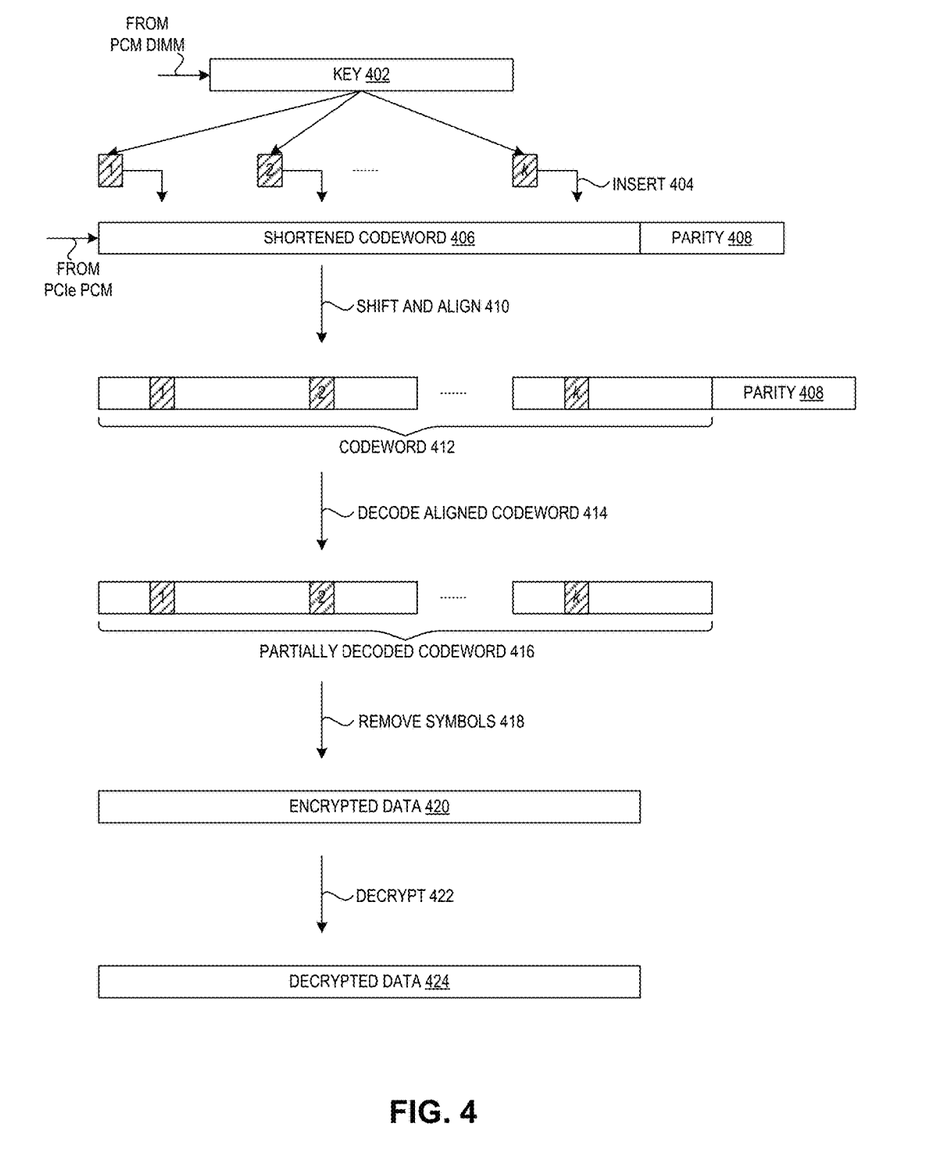
FIG. 4 presents an exemplary data transformation involved in reading data from a PCM, in accordance with an embodiment of the present application.

FIG. 4 presents an exemplary data transformation involved in reading data from a PCM, in accordance with an embodiment of the present application. The system can obtain a key 402 from a PCM DIMM, and can also obtain the transformed data (including shortened codeword 406 and parity bits 408) from a PCIe PCM. The system can perform an insert 404 function, which inserts symbols of key 402 into locations as indicated by the configuration information (e.g., trapping set locations of the LDPC encoding). The system can perform a shift and align 410 procedure to obtain a codeword 412, which includes the inserted key symbols. The system can perform a decode aligned codeword 414 function on codeword 412, which uses the configuration information of the LDPC encoder/decoder to obtain a partially decoded codeword 416 (e.g., reordered bits 254 in FIG. 2B). After the LDPC decoding converges, the system can subsequently perform a remove symbols 418 function to obtain encrypted data 420. Finally, the system can perform a decrypt 422 function using key 402 to obtain decrypted data 424.

Thus, decrypted data 424 may only be obtained or recovered using the key (for decrypting the data) and the configuration information (for aligning, reordering, decoding, and transforming the data back to its original form).

Method for Facilitating Data Destruction in a PCM-Based Storage Device

Figure 5:
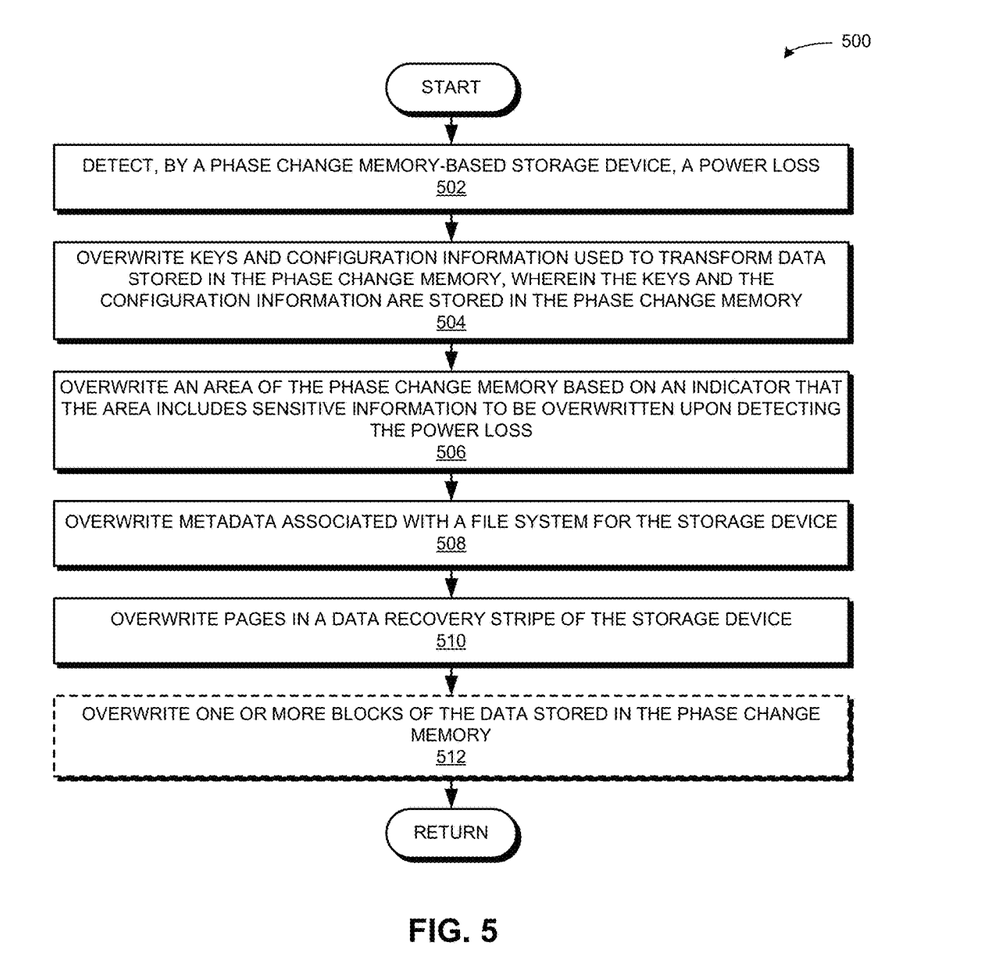
FIG. 5 presents a flowchart illustrating a method which facilitates data destruction in a PCM-based storage device, in accordance with an embodiment of the present application.

FIG. 5 presents a flowchart 500 illustrating a method which facilitates data destruction in a PCM-based storage device, in accordance with an embodiment of the present application. During operation, the system detects, by a phase change memory-based storage device, a power loss (operation 502). Subsequent to the power loss, the system overwrites keys and configuration information used to transform data stored in the phase change memory, wherein the keys and the configuration information are stored in the phase change memory (operation 504). The keys may be generated by the storage device or obtained via another entity or service. The configuration information can indicate an alignment, an ordering, and an error correction code (ECC) encoding used to transform the data. The ECC can be based on a low-density parity check (LDPC) code, and the configuration information can indicate locations in the data at which to insert data for variable nodes in a trapping set, as described above in relation to FIGS. 3A and 3B. By overwriting both the keys and the configuration information, the system prevents the stored data from being recovered subsequent to a power loss. That is, after the power loss, attempts to recover the transformed data stored in the PCM will fail because the LDPC decoding, alignment, ordering, and decryption required to recover the data cannot succeed without the keys and the configuration information.

The system also overwrites an area of the phase change memory based on an indicator that the area includes sensitive information to be overwritten upon detecting the power loss (operation 506). The area may include, for example, customer data which has been flagged as sensitive. In some embodiments, the area includes metadata corresponding to the sensitive customer data, and indicates how to overwrite the specific cells corresponding to the sensitive customer data. The system overwrites metadata associated with a file system for the storage device (operation 508). The metadata can indicate information relating to an organization of the data stored in the phase change memory. The system also overwrites pages in a data recovery stripe of the storage device (operation 510). By disabling the data recovery in this way (e.g., as in RAID or erasure coding), the system removes the dependence upon codewords, and further eliminates the possibility of retrieving data from peer codewords which are protected by the same system.

Finally, the system optionally overwrites one or more blocks of the data stored in the phase change memory (operation 512). The configuration information may indicate data in a list based on a priority of actual overwriting. If the system has sufficient residual power, and if the configuration information indicates in such a list (or via another mechanism) that the actual data stored in the PCM is to be overwritten, the system overwrites the actual PCM.

A hierarchy of data security assurance can include overwriting specific "critical" information needed to recover the data, including, e.g., the flagged customer data in a PCM DIMM, the keys, the configuration information, the file system metadata, and the data recovery stripe pages. Because PCM DIMM is byte-addressable, data stored in the PCM DIMM is overwritten byte by byte, also maximizing cross talk, as described further below. As described above in relation to FIG. 5, by overwriting the specific critical information, an attempt (after a power loss) by a malicious user or system to recover the PCM-stored data will fail for several reasons. The alignment information is not available, which prevents the malicious user from determining how to insert key symbols into a shortened codeword. The ECC configuration information is not available, which prevents the malicious user from determining how to decode a properly aligned codeword using, e.g., trapping set locations indicated in the configuration information. The data cannot be recovered because the alignment information, the ECC configuration information, and other information (e.g., file metadata and data recovery pages) needed to recover the data is no longer available. Finally, the encryption information (e.g., the corresponding key) is not available, which prevents the malicious user from decrypting any encrypted data. In some embodiments, the system writes the specific critical information to a remote system, such that the data stored in the PCM may be subsequently recovered using the remotely stored critical information.

Utilizing Cross Talk in Overwriting Data in the PCM

In overwriting any of the data stored in the PCM (e.g., the keys, the configuration information, the flagged sensitive area, the file system metadata, the data recovery stripe pages, and the blocks of data stored in the PCM), the system employs a maximum amount of cross talk. In order to write data to a cell of a PCM, a system applies heat to the cell, which results in writing the cell (and one or more of the cell's neighboring cells) into an amorphous state using a high-amplitude pulse. Appling the heat can cause "interference" or "cross talk" with the neighboring cells, which can cause both the cell and the neighboring cells to be written (or overwritten). Thus, as the heat accumulates, physical cells neighboring a given cell are written consecutively along with the given cell, i.e., affected by the changing and increasing thermal condition. The system thus "overwrites" the data stored in the given cell and its neighboring cells by changing the data stored therein.

In a traditional PCM write operation, data to be written is typically spread sequentially and evenly to avoid "hot spots" due to intensive programming, which also minimizes the amount of cross talk. In contrast, in the embodiments described herein, the system utilizes this interference characteristic of PCM, and allows cross talk to increase for a given cell and its neighboring cells.

Figure 6:
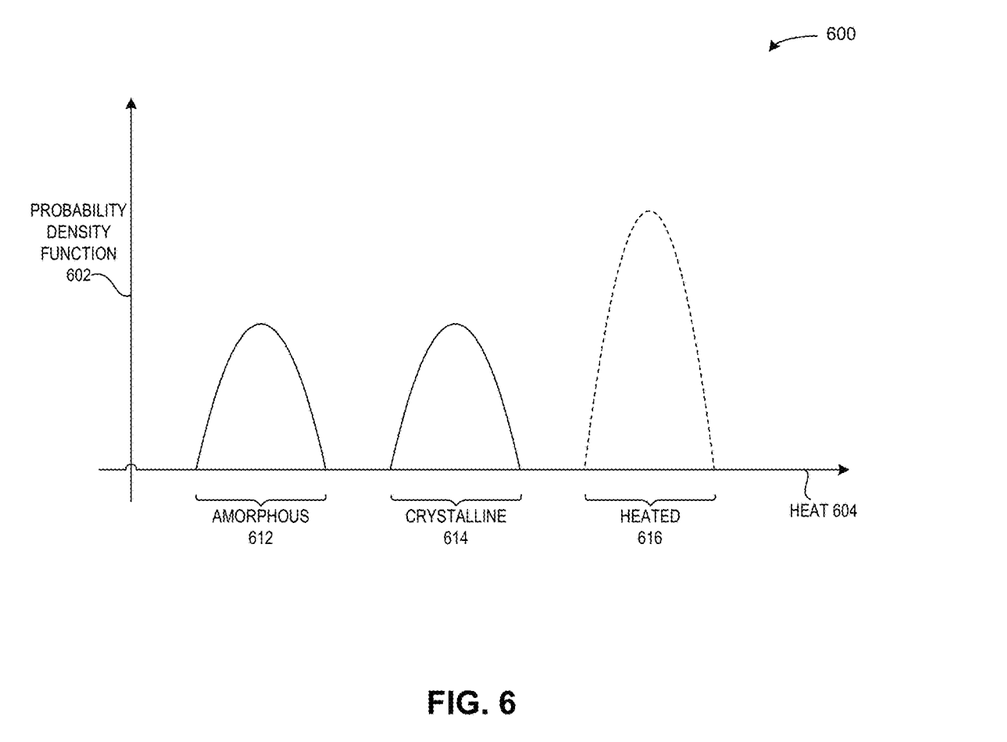
FIG. 6 illustrates an exemplary probability density function distribution during heating of a PCM, in accordance with an embodiment of the present application.

FIG. 6 illustrates an exemplary probability density function distribution 600 during heating of a PCM, in accordance with an embodiment of the present application. Distribution 600 can include an x-axis indicating a heat 604, and a y-axis indicating a probability density function 602. As heat is applied to the PCM (e.g., to a cell of the PCM), the state of the cell can change from an amorphous 612 state (which can indicate a bit value of, e.g., 1) to a crystalline 614 state (which can indicate a bit value of, e.g., 0). Upon further heating, the cell can enter a heated 616 state, in which the increased conductance and resulting decreased resistance may make the bit value of the cell difficult to determine or distinguish.

Thus, as the heat increases and accumulates in the PCM array, the thermal dissipation of the PCM modules worsens. Exemplary methods of increasing the heat include slowing down the server fan or blocking a wind vent near the PCM DIMM or PCIe PCM. The warmer temperature modifies the originally written state into an unrecognizable state, and thus destroys the old data in the physical PCM cells. In this manner, the embodiments described herein utilize the cross talk involved in overwriting cells in a PCM (in contrast to traditional techniques which seek to mitigate or minimize the cross talk).

Exemplary Computer System and Apparatus

Figure 7:
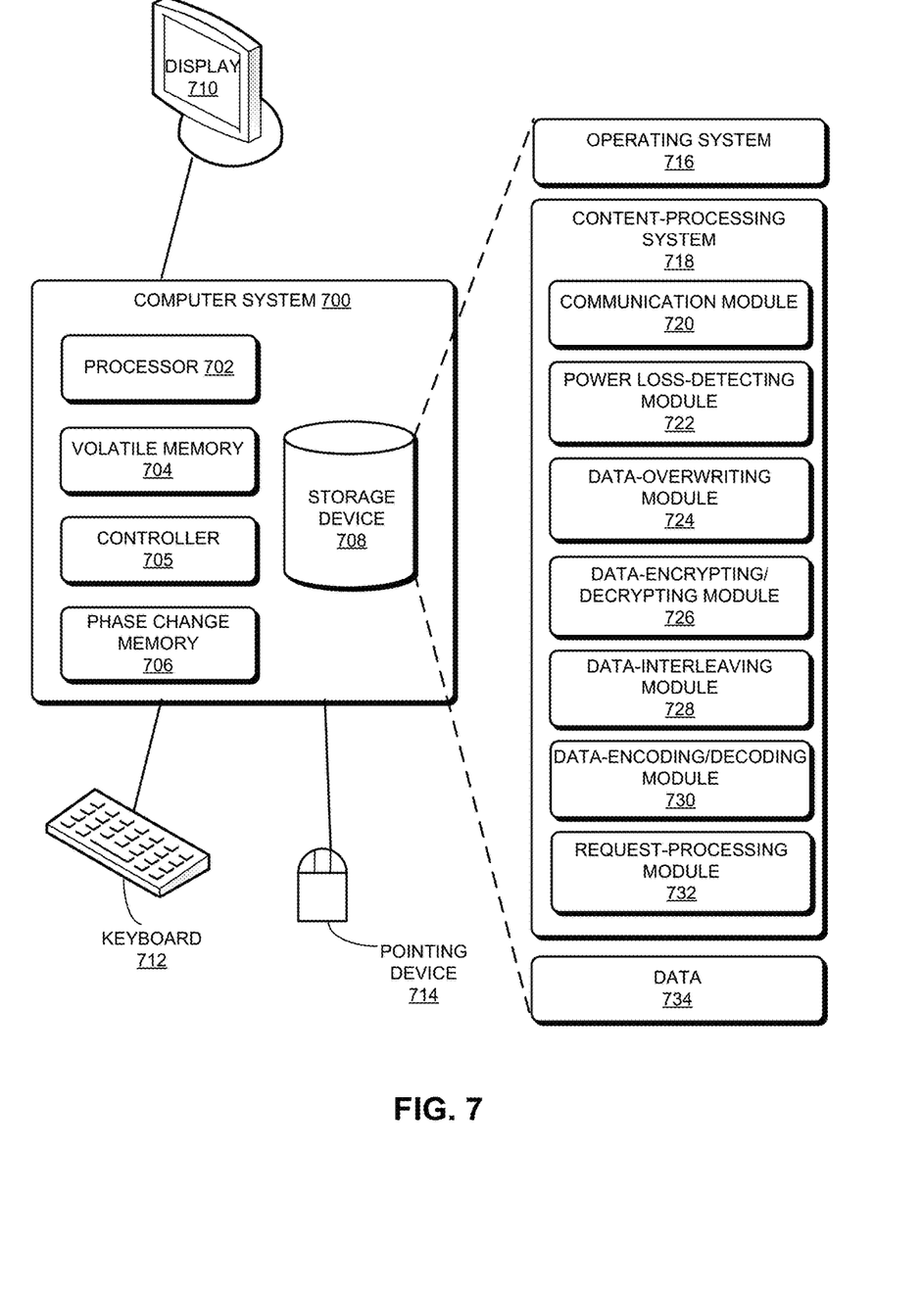
FIG. 7 illustrates an exemplary computer system that facilitates data destruction in a PCM-based storage device, in accordance with an embodiment of the present application.

FIG. 7 illustrates an exemplary computer system that facilitates data destruction in a PCM-based storage device, in accordance with an embodiment of the present application. Computer system 700 includes a processor 702, a volatile memory 704, a controller 705, a phase change memory (PCM) 706, and a storage device 708. Computer system 700 may be a client-serving machine. Volatile memory 704 can include, e.g., RAM, that serves as a managed memory, and can be used to store one or more memory pools. PCM 706 can include persistent storage that can be accessed via, e.g., controller 705. PCM 706 may also include a controller (not shown) configured to detect a power loss and overwrite specific critical information in the PCM. Controller 705 may also be configured to perform these operations. Furthermore, computer system 700 can be coupled to a display device 710, a keyboard 712, and a pointing device 714. Storage device 708 can store an operating system 716, a content-processing system 718, and data 734.

Content-processing system 718 can include instructions, which when executed by computer system 700, can cause computer system 700 to perform methods and/or processes described in this disclosure. Specifically, content-processing system 718 can include instructions for receiving and transmitting data packets, including a request to write or read data, and data to be processed (e.g., encrypted, reordered, encoded) and stored. Content-processing system 718 can further include instructions for detecting a power loss (power loss-detecting module 722). Content-processing system 718 can include instructions for, subsequent to the power loss: overwriting keys and configuration information used to transform data stored in the phase change memory (data-overwriting module 724); overwriting an area of the phase change memory based on an indicator that the area includes sensitive information to be overwritten upon detecting the power loss (data-overwriting module 724); and overwriting one or more blocks of the data stored in the phase change memory (data-overwriting module 724). Content-processing system 718 can include instructions for allowing a crosstalk to increase for a cell and neighboring cells (data-overwriting module 724).

Content-processing system 718 can include instructions for, subsequent to the power loss, overwriting metadata associated with a file system for the storage device, and overwriting pages in a data recovery stripe (data-overwriting module 724).

Content-processing system 718 can include instructions for receiving a first set of data to be stored in the phase change memory (communication module 720). Content-processing system 718 can include instructions for storing a first key for the first set of data (request-processing module 732), and for encrypting the first set of data based on the first key (data-encrypting/decrypting module 726). Content-processing system 718 can include instructions for transforming, based on the configuration information, the encrypted data by reordering the bits of the encrypted data and the first key (data-interleaving module 728) and by encoding the reordered bits to obtain a codeword (data-encoding/decoding module 730). Content-processing system 718 can include instructions for storing the transformed data in the phase change memory (request-processing module 732).

Content-processing system 718 can include instructions for receiving a request to read a first set of data stored in the phase change memory (request-processing module 732). Content-processing system 718 can include instructions for retrieving a first key for the first set of data, and for retrieving, from the phase change memory, transformed data corresponding to the first set of data (request-processing module 732). Content-processing system 718 can include instructions for recovering encrypted data by decoding the transformed data (data-encoding/decoding module 730) and reordering bits of the decoded data and the first key (data-interleaving module 728). Content-processing system 718 can include instructions for decrypting the encrypted data based on the first key to obtain the first set of data (data-encrypting/decrypting module 726), and for returning the first set of data to a requesting application (communication module 720).

Data 734 can include any data that is required as input or that is generated as output by the methods and/or processes described in this disclosure. Specifically, data 734 can store at least: data to be written, read, stored, or accessed; processed or stored data; encoded or decoded data; reordered or reshuffled data; encrypted or decrypted data; an error correction code (ECC) encoding or decoding; a codeword; a shortened code word; locations corresponding to inserted locations; parity bits; a key; symbols of a key; an indicator of an alignment, an ordering, or an ECC-encoding; an indicator of a power level or a power loss; configuration information; transformed data; an area; an indicator that an area of PCM includes sensitive information; a block or a cell of data stored in the PCM; an indicator of a memory module, a storage module, and a central processing unit; a low-density parity check (LDPC) code; an LDPC encoding scheme; a generator matrix; a parity check matrix; a sparse parity check matrix; a Tanner graph representation; a variable node; a check node; a file system; metadata associated with a file system; and pages in a data recovery stripe.

Figure 8:
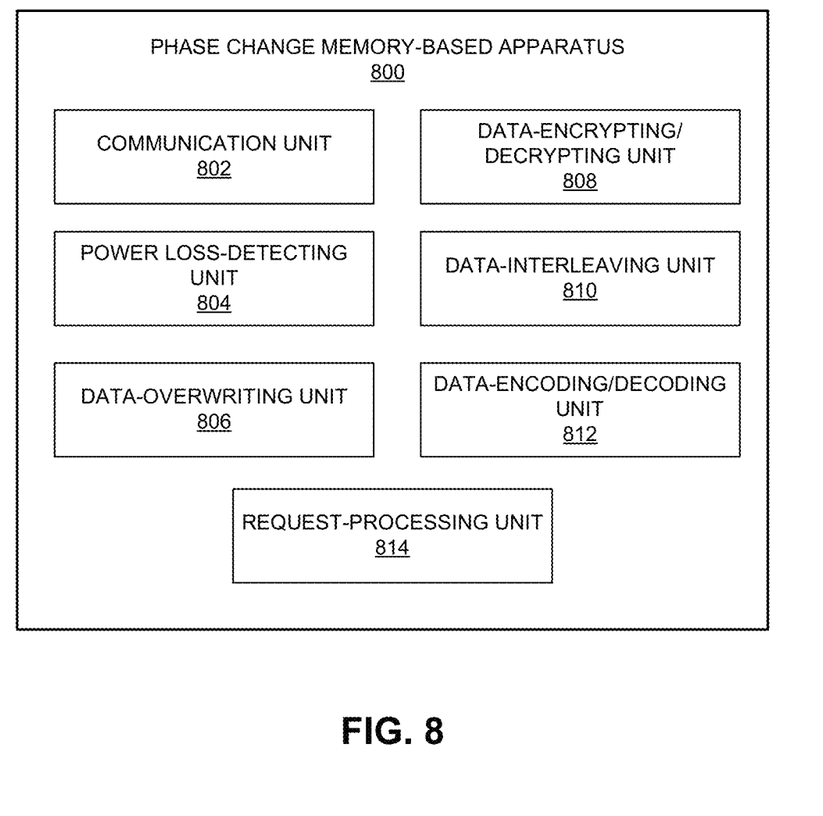
FIG. 8 illustrates an exemplary apparatus that facilitates data destruction in a PCM-based storage device, in accordance with an embodiment of the present application.

FIG. 8 illustrates an exemplary apparatus that facilitates data destruction in a PCM-based storage device, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-814 which perform functions or operations similar to modules 720-732 of computer system 700 of FIG. 7, including: a communication unit 802; a power loss-detecting unit 804; a data-overwriting unit 806; a data-encrypting/decrypting unit 808; a data-interleaving unit 810; a data-encoding/decoding unit 812; and a request-processing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data destruction in a phase change memory-based storage device, the method comprising:
   detecting, by the storage device, a power loss; and
   subsequent to the power loss:
      overwriting keys and configuration information used to transform data stored in the phase change memory without overwriting transformed data,
      wherein the keys and the configuration information are stored in the phase change memory,
      wherein the stored keys include a first key used to encrypt first data to be transformed as first transformed data,
      wherein the stored configuration information includes first configuration information indicating locations in the encrypted first data at which to insert symbols of the first key to obtain the first transformed data, and
      wherein the first transformed data stored in the phase change memory, thereby preventing the data, including the first data, from being recovered.

2. The method of claim 1, wherein subsequent to the power loss, the method further comprises:
   overwriting an area of the phase change memory based on an indicator that the area includes sensitive information to be overwritten upon detecting the power loss; and
   overwriting one or more blocks of the data stored in the phase change memory.

3. The method of claim 2, wherein overwriting the keys, the configuration information, the area, and the blocks of the phase change memory comprises allowing a crosstalk to increase for a cell and neighboring cells.

4. The method of claim 1,
   wherein when the keys, the configuration information, and the transformed data are stored in the phase change memory of a storage module of the storage device,
      the storage module communicates with a central processing unit via a peripheral component interconnect express protocol, and
   wherein when the keys are stored in the phase change memory of a memory module of the storage device and when the configuration information and the transformed data are stored in the phase change memory of the storage module of the storage device,
      the memory module communicates with the central processing unit via a memory bus.

5. The method of claim 1, wherein the configuration information indicates an alignment, an ordering, and an error correction code encoding used to transform the data,
   wherein the error correction code encoding is based on a low-density parity check code, and
   wherein the configuration information indicates locations at which to place data for variable nodes in a trapping set.

6. The method of claim 1, wherein subsequent to the power loss, the method further comprises:
   overwriting metadata associated with a file system for the storage device; and
   overwriting pages in a data recovery stripe.

7. The method of claim 1, further comprising:
   receiving, by the storage device, a first set of data to be stored in the phase change memory;
   storing a first key for the first set of data;
   encrypting the first set of data based on the first key;
   transforming, based on the configuration information, the encrypted data by reordering the bits of the encrypted data and the first key and by encoding the reordered bits to obtain a codeword; and
   storing the transformed data in the phase change memory.

8. The method of claim 1, further comprising:
   receiving, by the storage device, a request to read a first set of data stored in the phase change memory;
   retrieving a first key for the first set of data;
   retrieving, from the phase change memory, transformed data corresponding to the first set of data;
   recovering encrypted data by decoding the transformed data and reordering bits of the decoded data and the first key;
   decrypting the encrypted data based on the first key to obtain the first set of data; and
   returning the first set of data to a requesting application.

9. A computer system for facilitating data destruction in a phase change memory, the system comprising:
   a processor; and
   a memory coupled to the processor and storing instructions, which when executed by the processor cause the processor to perform a method, the method comprising:
   detecting, by the computer system, a power loss; and
   subsequent to the power loss:
      overwriting keys and configuration information used to transform data stored in a phase change memory of the computer system without overwriting the transformed data,
      wherein the keys and the configuration information are stored in the phase change memory,
      wherein the stored keys include a first key used to encrypt first data stored as transformed first data in the phase change memory,
      wherein the stored configuration information includes first configuration information indicating locations in the encrypted first data at which to insert symbols of the first key to obtain first transformed data, and
      wherein the first transformed data is stored in the phase change memory,
   thereby preventing the data, including the first data, from being recovered.

10. The computer system of claim 9, wherein subsequent to the power loss, the method further comprises:
    overwriting an area of the phase change memory based on an indicator that the area includes sensitive information to be overwritten upon detecting the power loss; and
    overwriting one or more blocks of the data stored in the phase change memory.

11. The computer system of claim 10, wherein overwriting the keys, the configuration information, the area, and the blocks of the phase change memory comprises allowing a crosstalk to increase for a cell and neighboring cells.

12. The computer system of claim 9, wherein the computer system is a storage device,
    wherein when the keys, the configuration information, and the transformed data are stored in the phase change memory of a storage module of the storage device,
       the storage module communicates with a central processing unit via a peripheral component interconnect express protocol, and
    wherein when the keys are stored in the phase change memory of a memory module of the storage device and when the configuration information and the transformed data are stored in the phase change memory of the storage module of the storage device, the memory module communicates with the central processing unit via a memory bus.

13. The computer system of claim 9, wherein the configuration information indicates an alignment, an ordering, and an error correction code encoding used to transform the data,
wherein the error correction code encoding is based on a low-density parity check code, and
wherein the configuration information indicates locations at which to place data for variable nodes in a trapping set.

14. The computer system of claim 9, wherein subsequent to the power loss, the method further comprises:
overwriting metadata associated with a file system for the storage device; and
overwriting pages in a data recovery stripe.

15. The computer system of claim 9, wherein the method further comprises:
receiving, by the computer system, a first set of data to be stored in the phase change memory;
storing a first key for the first set of data;
encrypting the first set of data based on the first key;
transforming, based on the configuration information, the encrypted data by reordering the bits of the encrypted data and the first key and by encoding the reordered bits to obtain a codeword; and
storing the transformed data in the phase change memory.

16. The computer system of claim 9, wherein the method further comprises:
receiving, by the computer system, a request to read a first set of data stored in the phase change memory;
retrieving a first key for the first set of data;
retrieving, from the phase change memory, transformed data corresponding to the first set of data;
recovering encrypted data by decoding the transformed data and reordering bits of the decoded data and the first key;
decrypting the encrypted data based on the first key to obtain the first set of data; and
returning the first set of data to a requesting application.

17. A non-volatile memory which is a phase change memory, comprising a controller configured to:
detect a power loss; and
subsequent to the power loss:
overwrite keys and configuration information used to transform data stored in the phase change memory without overwriting the transformed data,
wherein the keys and the configuration information are stored in the phase change memory,
wherein the stored keys include a first key used to encrypt first data stored as transformed first data in the phase change memory,
wherein the stored configuration information includes first configuration information indicating locations in the encrypted first data at which to insert symbols of the first key to obtain first transformed data, and
wherein the first transformed data is stored in the phase change memory,
thereby preventing the data, including the first data, from being recovered.

18. A phase change memory-based storage device, comprising:
a memory module which includes a first phase change memory; and
a storage module which includes a second phase change memory,
wherein in response to detecting a power loss, the device overwrites keys and configuration information used to transform data stored in the second phase change memory without overwriting the transformed data,
wherein the keys are stored in the first phase change memory and the configuration information is stored in the second phase change memory, and
wherein the stored keys include a first key used to encrypt first data stored as transformed first data in the second phase change memory,
wherein the storage configuration information includes first configuration information indicating locations in the encrypted first data at which to insert symbols of the first key to obtain first transformed data, and
wherein the first transformed data is stored in the second phase change memory,
thereby preventing the data, including the first data, from being recovered.

\* \* \* \* \*

UNITED STATES PATENT AND TRADEMARK OFFICE
CERTIFICATE OF CORRECTION

| | |
|---|---|
| PATENT NO. | : 10,496,829 B2 |
| APPLICATION NO. | : 15/705698 |
| DATED | : December 3, 2019 |
| INVENTOR(S) | : Shu Li and Ping Zhou |

It is certified that error appears in the above-identified patent and that said Letters Patent is hereby corrected as shown below:

In the Claims

Column 13, Claim 1, Lines 23-24 should read "wherein the first transformed data is stored in the phase change memory,"

Column 13, Claim 7, Line 64 should read "The method of claim 1, further comprising:
receiving, by the storage device, the first data to be stored in the phase change memory;
storing the first key for the first data;
encrypting the first data based on the first key;
transforming, based on the configuration information, the first encrypted data by reordering bits of the first encrypted data and the first key and by encoding the reordered bits to obtain a codeword; and
storing the codeword in the phase change memory."

Column 14, Claim 8, Line 7 should read "The method of claim 1, further comprising:
receiving, by the storage device, a request to read second data stored in the phase change memory;
retrieving a second key for the second data;
retrieving, from the phase change memory, second transformed data corresponding to the second data;
recovering second encrypted data by decoding the second transformed data and by reordering bits of the decoded second transformed data and the second key;
decrypting the second encrypted data based on the second key to obtain the second data; and returning the second data to a requesting application."

Column 14, Claim 9, Line 19 should read "9. A computer system for facilitating data destruction in a phase change memory, the system comprising:
a processor; and
a memory coupled to the processor and storing instructions, which when executed by the processor cause the processor to perform a method, the method comprising:
detecting, by the computer system, a power loss; and
subsequent to the power loss:

Signed and Sealed this
Eighth Day of November, 2022

*Katherine Kelly Vidal*

Katherine Kelly Vidal
*Director of the United States Patent and Trademark Office* overwriting keys and configuration information used to transform data stored in a phase change memory of the computer system without overwriting transformed data,
wherein the keys and the configuration information are stored in the phase change memory,
wherein the stored keys include a first key used to encrypt first data to be transformed as first transformed data, wherein the stored configuration information includes first configuration information indicating locations in the encrypted first data at which to insert symbols of the first key to obtain the first transformed data, and
wherein the first transformed data is stored in the phase change memory,
thereby preventing the data, including the first data, from being recovered."

Column 15, Claim 15, Line 17 should read "15. The computer system of claim 9, wherein the method further comprises:
receiving, by the computer system, the first data to be stored in the phase change memory;
storing the first key for the first data;
encrypting the first data based on the first key;
transforming, based on the configuration information, the first encrypted data by reordering bits of the first encrypted data and the first key and by encoding the reordered bits to obtain a codeword; and
storing the codeword in the phase change memory."

Column 15, Claim 16, Line 28 should read "16. The computer system of claim 9, wherein the method further comprises:
receiving, by the computer system, a request to read second data stored in the phase change memory;
retrieving a second key for the second data;
retrieving, from the phase change memory, second transformed data corresponding to the second data;
recovering second encrypted data by decoding the second transformed data and by reordering bits of the decoded second transformed data and the second key;
decrypting the second encrypted data based on the second key to obtain the second data; and
returning the second data to a requesting application.

Column 15, Claim 17, Line 41 should read "17. A non-volatile memory which is a phase change memory, comprising a controller configured to:
detect a power loss; and
subsequent to the power loss:
overwrite keys and configuration information used to transform data stored in the phase change memory without overwriting transformed data,
wherein the keys and the configuration information are stored in the phase change memory,
wherein the stored keys include a first key used to encrypt first data to be transformed as first transformed data, wherein the stored configuration information includes first configuration information indicating locations in the encrypted first data at which to insert symbols of the first key to obtain the first transformed data, and
wherein the first transformed data is stored in the phase change memory,
thereby preventing the data, including the first data, from being recovered."

Column 16, Claim 18, Line 19 should read "18. A phase change memory-based storage device, comprising:
a memory module which includes a first phase change memory; and a storage module which includes a second phase change memory,
wherein in response to detecting a power loss, the device overwrites keys and configuration information used to transform data stored in the second phase change memory without overwriting transformed data, wherein the keys are stored in the first phase change memory and the configuration information is stored in the second phase change memory, and
wherein the stored keys include a first key used to encrypt first data to be transformed as first transformed data in the second phase change memory,
wherein the stored configuration information includes first configuration indicating locations in the encrypted first data at which to insert symbols of the first key to obtain the first transformed data, and wherein the first transformed data is stored in the second phase change memory,
thereby preventing the data, including the first data, from being recovered."